Sept. 9, 1941.  K. A. NYGREN  2,255,675
MULTIPLE BEARING THRUST BLOCK
Filed May 20, 1938  2 Sheets-Sheet 1
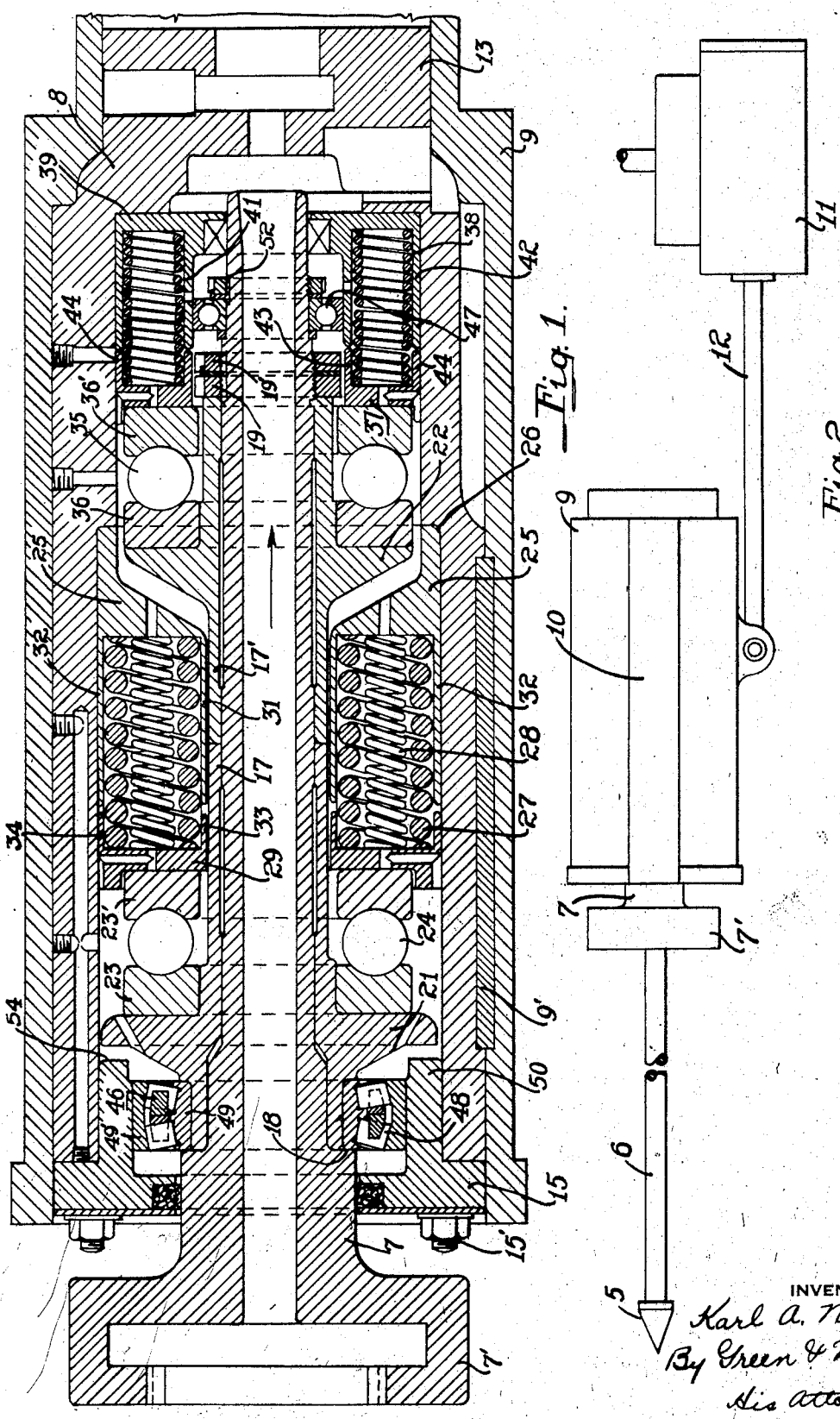
INVENTOR
Karl A. Nygren
By Green & McCallister
His Attorneys

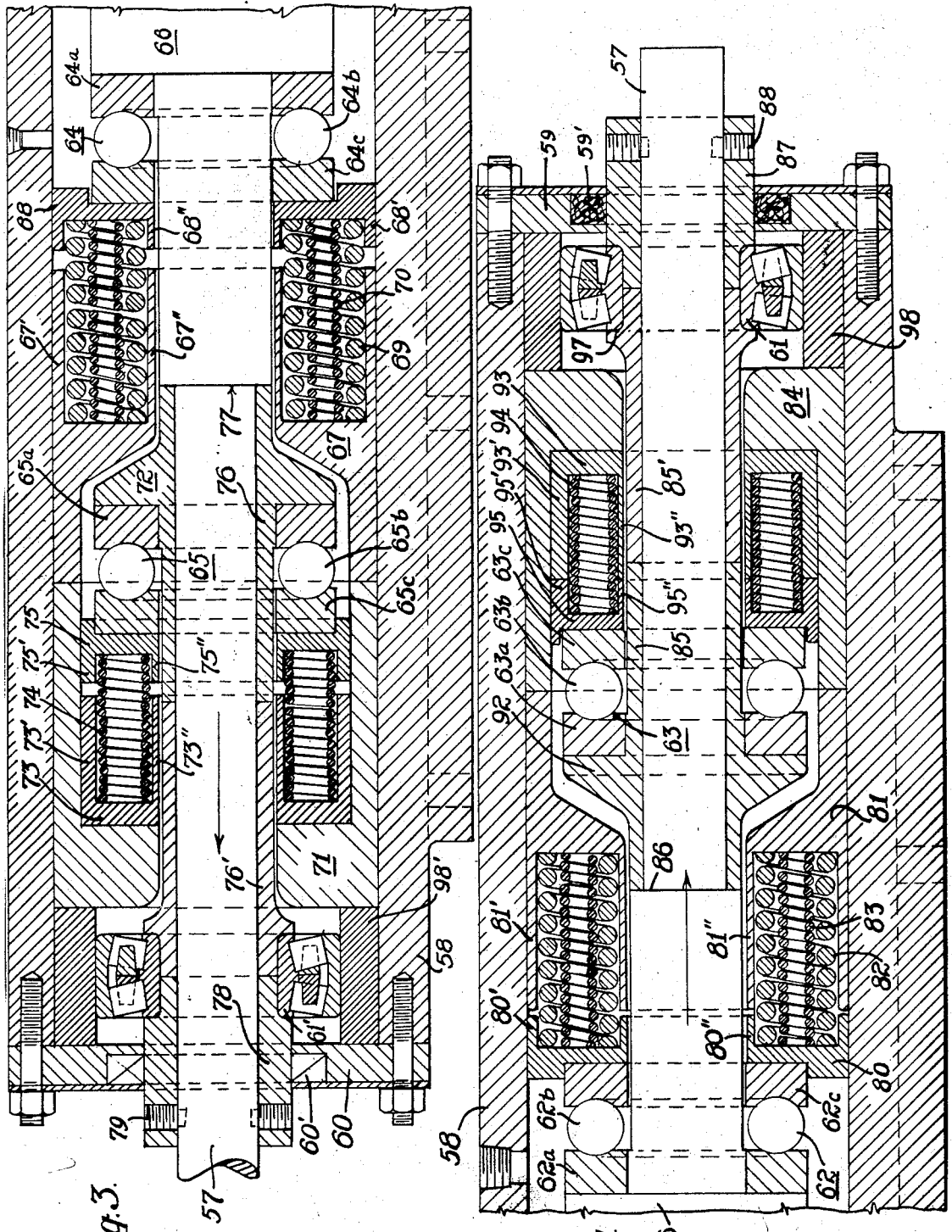

Patented Sept. 9, 1941

2,255,675

UNITED STATES PATENT OFFICE 2,255,675

MULTIPLE BEARING THRUST BLOCK

Karl A. Nygren, Belle Vernon, Pa.

Application May 20, 1938, Serial No. 209,047

2 Claims. (Cl. 308—233)

This invention relates to apparatus for counteracting the axial or longitudinal thrust imparted to rotatable shafts and has for an object to produce a new and improved thrust block assembly wherein means are employed for apportioning the shaft-imparted thrust between a plurality of bearings and in such a way as to insure the effective operation of all bearings.

A specific object of my invention is to provide a new and improved thrust block for use as an integral part of a pipe piercing machine.

In all pipe piercing apparatus the piercing mandrel is secured to a spindle which is adapted for high speed rotation and is so supported by a thrust block as to accommodate such rotation and at the same time take care of (counteract) the end or longitudinal thrust imparted by the piercing mandrel to the spindle during each piercing operation.

A further and still more specific object of my invention is to provide a thrust block for a piercing machine in which the spindle is provided with two anti-friction thrust bearings and in which means, responsive to variations in the end thrust imparted to the spindle, is employed for apportioning the thrust between the two bearings and in such a way as to substantially divide the thrust between the bearing during conditions of maximum thrust.

These and other objects which will be made more apparent throughout the further description of my invention are attained by means of the apparatus illustrated in the drawings accompanying and forming a part hereof.

Figure 1 is a longitudinal sectional view of a piercing machine spindle associated with a thrust block embodying my invention, the cage of the thrust block housing being more or less diagrammatically shown and also broken away for convenience of illustration.

Fig. 2 is a diagrammatic view of the piercer, the carrying rod therefor, the spindle and thrust block cage all shown associated with a positioning cylinder.

Fig. 3 is a fragmental longitudinal sectional view which, when taken with the fragmental longitudinal sectional view of Fig. 4, discloses an improved thrust block for use, for example, in connection with marine propeller shafts or in relationships where the direction of the thrust may be reversed during the operation of the associated apparatus.

My invention consists broadly in providing at least two thrust bearings for a rotatable shaft and in providing means for proportioning the thrust to each such bearing and in such a way as to avoid overloading any bearing during periods or conditions of maximum thrust. The apparatus illustrated as an embodiment of this invention discloses a rotatable shaft, such as the rotatable spindle of a piercing machine, and the shaft is equipped with anti-friction bearings for counteracting the radial and longitudinal forces. The anti-friction bearings are shown in the form of roller and ball bearings. While the thrust-imparting rotatable shaft may be provided with several thrust bearings, the apparatus illustrated is provided with two such bearings and also with means for apportioning the shaft-imparted thrust between the two bearings in such a way that the thrust will be substantially equally divided between the two when the conditions of predetermined maximum thrust is reached.

In one embodiment of my invention (Figs. 3 and 4) I have illustrated an arrangement of thrust block wherein means are employed for taking care of (counteracting) the thrust in either direction. That is to say, the apparatus there illustrated is provided with two sets of oppositely disposed thrust bearings so arranged that a thrust on the shaft in one direction is absorbed by one such set whereas a thrust on the shaft in the other direction is absorbed by the other set. It will be apparent that more than two thrust bearings may be employed in each such set and that the thrust apportioning apparatus may be such that the thrust imparted to at least certain of the bearings will never exceed a predetermined maximum.

Fig. 2 is a diagrammatic illustration of apparatus such as is, or may be employed in pipe piercing operations and the intent is to illustrate an embodiment of my invention which may form a part of such apparatus. The piercer or piercing mandrel 5 is mounted on the end of a carrying rod 6 which is in turn secured to the thrust spindle 7 in the usual manner, viz., through the agency of the rod-receiving portion 7' of the spindle. As is usual, the spindle 7 is mounted in a housing 8 (not shown in Fig. 2 but illustrated in section in Fig. 1) and the housing is located within and splined to a cage 9. The cage 9 is adapted to be supported in suitable ways by means of radially projecting wings 10, one of which is shown in Fig. 2. The wings 10 extend longitudinally of the cage and also of the spindle 7 and not only support the cage on the ways but also prevent its turning under the influence of the rotative forces imparted to the spindle 7 during the piercing operation. I have also diagrammatically illustrated a positioning means for the cage 9 and consequently for the piercing mandrel 5. As shown, this means includes a piston and cylinder assembly 11 and a piston rod 12 which is suitably secured to the cage 9 in such a way that the piston-cylinder assembly may be employed to advance and retract the cage along its supporting ways and thus not only adjust the position of the piercing mandrel 5 with relation to the piercing rolls and the billet engaged by it and those rolls, but also hold the mandrel in the adjusted position. This apparatus forms no part of the present invention except that my improved means for counteracting the thrust of the piercer and the associated spindle may be employed in connection therewith.

Referring to Fig. 1, the spindle 7 projects into a housing 8, which is located within a cage 9 and is splined to the cage as at 9'. The housing consists essentially of a cylindrical portion provided at one end with a head 13 formed as a unitary part thereof and at the other end with a separately formed housing cap 15 which is suitably secured to the cylindrical portion of the housing by means of a circular series of studs and nuts 15'. Spindle 7 is of the usual hollow construction for the purpose of transmitting cooling water to the piercing mandrel and projects through the cap 15. In the illustrated embodiment the spindle is provided with a quill 17 which more or less snugly fits the spindle 7 and is secured in place thereon between a shoulder 18, formed on the spindle adjacent one end thereof, and a nut 19 screwed onto the spindle at a point adjacent the other end thereof. The nut 19 is associated with a suitable lock washer and a lock nut assembly 19' and the arrangement is such that the quill 17 functions as an integral part of the spindle 7. For convenience of manufacture and assembly, the quill may be formed in two parts as shown, and each part may be provided with what may be termed a thrust member adapted to cooperate with an individual thrust bearing in transmitting thrust to the housing 8. I have applied the numeral 21 to one such thrust member and the numeral 22 to the other.

The thrust member 21 is associated with a ball bearing made up of races 23 and 23', and balls 24. The race 23 surrounds and is mounted on the quill 17 and one of its annular faces contacts the thrust imparting face of the thrust member 21. In the illustrated embodiment this thrust imparting face of the member 21 extends radially and also at right angles to the axis of the spindle 7. The annular ball engaging groove of the race 23 is formed in the face thereof opposite that contacting the member 21 and the cooperation between the parts is such that the race 23 functions as an integral part of the member 21 and may therefore be termed the thrust race.

From the foregoing it is apparent that the function of the ball bearing and the member 21 is to transmit longitudinal thrust of the spindle 7 to the housing 8 and consequently the cage 9. For this purpose the housing is provided with what may be termed a pedestal block 25 of annular form and surrounding the spindle 7 and its quill 17. This pedestal block 25 seats against an appropriate annular shoulder 26 formed on the inner face of the housing 8 and, in the apparatus illustrated, performs the double function of transmitting spindle thrust to the housing and of also supporting a double series of coil springs 27 and 28. Each spring 27 of one series is shown surrounded by a spring 28 of the other series. A cooperating spring block 29 is located between the springs 27 and 28 and the ball race 23'. From this it will be apparent that the spring block 29 is yieldingly supported by the pedestal block 25 and that the race 23' in effect forms the pedestal or thrust-receiving portion of the ball bearing. In the illustrated embodiment, the pedestal block 25 is provided with two annular flanges 31 and 32 which project in spaced relation longitudinally of the spindle and form a partial closure for the annular series of springs 27 and 28. The spring block or pedestal member 29 is also provided with similarly arranged but oppositely disposed annular flanges 33 and 34 which cooperate with the flanges 31 and 32 in forming a housing for the springs. It, however, should be noted that the flanges are so formed that those of the pedestal block 25 never engage those of the spring block or pedestal member 29.

The thrust member 22 is operatively associated with a ball bearing consisting of balls 35, a race 36 and a race 36'. The relationship of the race 36 to the thrust member 22 and the quill part 17' is similar to that described in connection with the thrust member 21 and race 23; consequently the race 36 may be termed a thrust-imparting race of the second thrust bearing. The race 36' is associated with a spring block or pedestal member 37 corresponding to the spring block or pedestal member 29, and may be termed the pedestal member of the bearing. The spindle thrust transmitted to the balls 35 of the bearing is imparted to the housing 8 through the spring block 37, a series of coil springs 38 and a pedestal member 39. The member 39 engages and is supported by an internal shoulder of the housing 8, and, like the pedestal member 25, is provided with annular flanges 41 and 42 which correspond to the flanges 31 and 32 and cooperate with flanges 43 and 44 formed on the pedestal member 37. There is this difference, however, the flanges are of such length that those of the member 37 engage those of the member 39 after the springs 38 have yielded a predetermined amount and the contacting flanges thus produce rigid annular struts which positively transmit spindle thrust to the housing 8.

Radial forces occasioned by the rotation of the spindle 7 are taken up by the roller bearing 46 and ball bearings 47. The bearing 46 is a usual form of roller bearing and is provided with two sets of rollers 48, the axes of which are inclined with relation to each other. As a result, each race 49 and 49' is provided with two roller-engaging bearing faces and each such face is inclined with relation to each other and also with relation to the axis of the spindle 7. The inner race 49 is rigidly locked in place on the spindle by being held in place between a shoulder formed on the spindle and an oppositely faced shoulder formed on the quill 17. The outer race 49' is supported by the inner cylindrical face of an annular re-entrant flange 50 formed on the housing cap 15. The race 49' is, however, so sized with relation to the inner diameter of the flange 50 that it is capable of sliding longitudinally along the flange as the spindle moves longitudinally in response to variations in thrust imparted to it.

The ball bearing 47 is likewise capable of moving with the spindle as it responds to variation in the thrust imparted to it. This bearing is illustrated as a commercial form of ball bearing, the inner race of which is secured to the spindle 7 by means of an appropriate shoulder formed on the shaft and a suitable collar, lock washer and nut 52. The nut 52 is threaded onto the spindle 7 and clamps the inner race and collar against a shoulder of the shaft. The outer race bears on the inner cylindrical face of the flange 41 which, as previously stated, forms a part of the pedestal block 39. The fit between this race and the flange 41 is as described in connection with the race 49' and the re-entrant flange 50, viz., it is a sliding fit which permits the race to move longitudinally of the flange 41 as the spindle moves axially in response to variations in the thrust imposed on it. It will, of course, be understood that both the bearings 47 and 48 are so formed and so supported by the associated surfaces as to accommodate the rotation of the spindle but at the same time prevent spindle vibration.

The foregoing description discloses that the longitudinal thrust on the spindle is taken up by yieldingly supported thrust bearings and that the arrangement is such that the spindle moves axially and in the direction of the thrust (to the right as indicated in Fig. 1) in response to an increasing thrust imparted to it by the piercing mandrel 5. The extent of this motion depends upon the magnitude of the thrust and upon the reactive force exerted by the springs 27, 28 and 38. The extent of the motion will also depend upon the provisions made for spindle movement in the design of each particular thrust block. In the illustrated embodiment the longitudinal movement of the spindle is limited to a small fraction of an inch and the springs 27 and 28 are so designed that they will transmit approximately one-half of the spindle thrust to the housing when the predetermined maximum thrust has been reached. Under such conditions the flanges 43 and 44 are moved into contact with the respective flanges 41 and 42 and are therefore acting as rigid struts in transmitting spindle thrust to the housing 8.

In the drawings the springs 38 are disclosed as much smaller and fewer in number than the springs 27. In addition the springs 27 are supplemented by the inner coil springs 28 with the result that the reactive force resisting the initial movement of the shaft, in response to the thrust of the mandrel 5, is much greater at the spring block 29 than at the spring block 37 with the result that the major portion of the spindle thrust will be taken by the ball bearing assembly 23, 23', 24 up until the time that the flanges of the member 37 contact the flanges of the member 39 and cooperate as struts in transmitting the shaft thrust to the housing 8. It should be noted that the extent of the thrust taken up by the pedestal block 25 will depend upon the reactive force exerted by the springs 27 and 28 (i. e., the strength of the springs 27 and 28) and that where it is desired to substantially equalize the thrust on the two bearings under maximum thrust conditions, the springs 27 and 28 will be so designed that they will transmit half the maximum contemplated thrust when stressed to the point that the flanges 43 and 44 contact with the respective flanges 41 and 42 and constitute rigid struts in transmitting thrust from the shaft 7 to the housing 8. When this condition has been reached, the thrust imparted by the thrust member 21, the associated bearing and the pedestal block 25 will of course be determined by the reactive force of the springs 27 and 28 and all additional spindle thrust will be transmitted from the spindle to the housing by cooperation of the thrust member 22, the thrust bearing assembly 35—36 and 36', the spring block 37, the flanges 41—42—43—44 and the pedestal block 39.

From the foregoing it will also be apparent that a reduction in the spindle thrust below one-half of the contemplated maximum will occasion movement of the spindle in a direction opposite to that indicated by the arrow of Fig. 1; i. e., toward the point of activity of the mandrel 5.

The initial reduction in thrust will occasion no longitudinal movement of the shaft and there will be no movement until the thrust on the shaft is less than the combined strength or reactive force of the springs 27, 28 and 38, at which time the flanges of the member 37 will move out of contact with the flanges of the pedestal block 39. At this instant the shaft thrust is yieldingly resisted by the spring supported thrust bearings and thrust imparted to the housing 8 by each such bearing is equal to the reactive force of its cooperating springs. Thus it is apparent that the spindle 7 moves longitudinally of itself in response to an increasing thrust and that this motion is in the direction of the thrust. It also moves longitudinally in response to a decreasing thrust, and here the motion is in a direction opposite to that of the thrust. During both such movements the bearings 47 and 48 move with the spindle and both such movements are to some extent controlled by the springs 27, 28 and 38.

I have shown the re-entrant flange 50 of the housing cap 15 so arranged with relation to a face of the thrust member 21 that its annular face 54 is capable of functioning as a braking surface when engaged by the member 21. This face 54 is so positioned that it will contact the member 21 after the spindle 7 has moved a predetermined amount in response to a decreasing thrust and while all of the springs 27, 28 and 38 are still under tension. Thus it should be noted that the springs 27, 28 and 38 are always under pressure and that the springs 38 always function to hold the race 36' in operative position with relation to the race 36 and balls 35 and the springs 27 and 28 always function to hold the race 23' in operative position with relation to the balls 24 and race 23 and even when the mandrel 5 is disengaged from the work and is transmitting no thrust to the rod 6 and the spindle 7. That is to say, the apparatus is so designed that the thrust springs 27, 28 and 38 are always under tension and even when the apparatus is not in operation. It will also be apparent that the braking force occasioned by the contact between the face 54 and the thrust member 21 will depend upon the residual tensional force exerted by the springs after the thrust member 21 contacts the face 54 of the housing cap 50.

In the apparatus illustrated, I contemplate delivering cooling water to the interior of the spindle 7 and consequently I have shown the more or less usual arrangement of cooling water passages which is ordinarily employed in a spindle and spindle housing. I also contemplate delivering sufficient oil to the interior of the housing to insure adequate lubrication of all of the bearings at all times and I have illustrated oil passages so formed that they will permit the movement of oil to all parts of the interior of the housing and under conditions such that confined oil will never hamper the longitudinal or rotary movement of the spindle and the associated spindle parts.

In Figs. 3 and 4 I have illustrated a thrust receiving housing and associated apparatus which may be employed in connection with a spindle or shaft such, for example, as a marine propeller shaft wherein the direction of the thrust imposed on the shaft may be reversed by reason of a reversal of the rotation of the shaft. As there shown, a rotatable shaft 57 extends through a cylindrical housing 58 and the housing caps 59 and 60 are both provided with packing glands 59' and 60' for sealing the joint between them and the shaft. Here again the radial forces occasioned by the rotation of the shaft are taken up by separate bearings. Two such bearings 61 and 61' are shown and each is illustrated as a commercial form of roller bearing provided with two sets of rollers in which the axes of the rollers of each set are inclined to the axis of the shaft and also to the axes of the rollers of the other set.

In this embodiment of my invention I also contemplate employing a plurality of thrust bearings for counteracting the thrust in each direction and I also contemplate apportioning the encountered thrust among such bearings. As illustrated, I have disclosed four thrust bearings, all of the anti-friction type and shown as ball bearings. Each such bearing is similar to a thrust bearing heretofore described in connection with the apparatus illustrated in Fig. 1 and each cooperates with one other in counteracting the spindle thrust or in transmitting that thrust to the housing 58. It so happens that a spindle or shaft thrust in the direction of the arrow of Fig. 3 is counteracted by the two thrust bearings 62 and 63 illustrated in Fig. 4, whereas a spindle thrust in the opposite direction, i. e., in the direction of the arrow of Fig. 4, is counteracted by the two thrust bearings 64 and 65 illustrated in Fig. 3.

In the illustrated embodiment, the shaft 57 is provided with a central collar 66 which may be formed as a unitary part thereof. The thrust bearing 62 is located on one side of this collar and the thrust bearing 64 is located on the other side of it. As illustrated, the bearing 64 includes a ball race 64a, a series of balls 64b, and a ball race 64c. The race 64a surrounds the shaft 57 and one lateral face thereof (the face opposite the grooved face) lies against the adjacent lateral face of the collar 66 so that the race is supported by the collar and the shaft. The collar 66 corresponds to the thrust member 21 heretofore described in connection with the apparatus of Fig. 1 and consequently the race 63a may be designated as the thrust race of the bearing 63. It, therefore, follows that the race 64c may be termed the pedestal race in that it functions as an integral part of a pedestal member 67 which surrounds the shaft 57 but is spaced therefrom. As in the apparatus previously described, the race 64c surrounds but is spaced from the shaft 57 and it is, in effect, carried by a spring block 68. The spring block surrounds but is spaced from the shaft 57. Two annular series of coil springs 69 and 70 intervene between the pedestal member 67 and the spring block 68 so that the thrust of the shaft is transmitted through the bearing 64, springs 69 and 70, and the pedestal member 67 to the housing 58.

As shown, the pedestal member 67 is of annular form and bears against a substantially cup-shaped pedestal block 71 which performs the double function of transmitting the thrust of both the bearings 64 and 65 to the housing 58.

The spring block 68 is provided with longitudinally extending, spaced, annular flanges 68' and 68" which cooperate with corresponding but oppositely projecting flanges 67' and 67" of the pedestal member 67 in partially enclosing the springs 67 and 69. As described in connection with the housing for the springs 27 and 28 in Fig. 1, these flanges are of such length that they never contact during the relative motion between the spring block 68 and the pedestal member 67 occasioned by the thrust imparted to the shaft 57.

The ball thrust bearing 65 is located between a thrust member 72 and a pedestal assembly including the pedestal block 71, a spring housing 73, a series of coil springs 74 and a spring block 75.

As shown, the thrust member 72 is formed as a part of a two-part quill 76—76' which surrounds the shaft 57 and is held in place thereon by a shoulder 77 formed on the shaft and a collar 78 which, as shown, is secured to the shaft by means of a series of set screws 79.

The thrust bearing 65 includes a thrust race 65a which surrounds and is supported on the quill part 76 and is engaged by the lateral or thrust face of the member 72. The bearing also includes the series of balls 65b and a pedestal race 65c which surrounds the quill but is spaced therefrom and is, in effect, carried by the spring block 75.

The spring block 75 is provided with longitudinally projecting flanges 75' and 75" which cooperate with the block 75, flanges 73' and 73" and the pedestal member 73 in forming a housing for the series of coil springs 74. As described in connection with the thrust bearing assembly 35—36—36' of Fig. 1, the flanges 73' and 73" are of such length and so positioned with relation to the respective flanges 75' and 75", that they engage those flanges and then constitute a substantially rigid strut for transmitting thrust from the thrust member 72 to the pedestal member 73 and consequently to the housing 58. That is to say, the shaft 57 is adapted to move longitudinally and in opposition to pressure of the springs 69—70—74 in response to thrust imparted to the shaft in the direction of the arrow of Fig. 3 and this movement causes the flanges 75' and 75" to contact with the respective flanges 73' and 73" and thereby constitute substantially rigid struts which check further such movement of the shaft and transmit shaft thrust direct to the pedestal member 73 and pedestal block 71.

The apparatus is substantially bi-laterally symmetrical about a transverse plane midway between the active or thrust faces of the shaft collar 66. With this in mind it will be apparent that the thrust bearing 62 includes a thrust race 62a which bears against and is in effect a part of the thrust collar 66. The bearing also includes a series of balls 62b and a pedestal bearing 62c which surrounds but is spaced from the shaft 57 and is in effect an integral part of a pedestal assembly. It is carried by a spring block 80. The spring block 80 forms a part of the pedestal assembly which includes pedestal member 81 and two series of coil springs 82 and 83. This pedestal assembly corresponds to the pedestal assembly 67—68—69—70 of Fig. 3 and cooperates with a substantially cup-shaped pedestal block 84 in transmitting the thrust imparted by the thrust bearing 62 to the housing 58.

The spring block 80 is provided with two longitudinally extending flanges 80' and 80" which cooperate with correspondingly located but oppositely disposed annular flanges 81' and 81" of the pedestal member 81 in forming a housing for coil springs 82 and 83. These housing flanges are so formed, however, that those of the block 80 never contact with those of pedestal member 81, even under conditions of maximum thrust.

A two part quill 85—85' fits over the shaft 57 and is held thereon between a shaft shoulder 86 and a collar 87 which is rigidly secured to the shaft by means of set screws 88. A thrust member 92 is shown formed as a unitary part of the quill part 85 and is arranged to transmit shaft thrust to the bearing 63. The bearing 63 is made up of a thrust race 63a, a series of balls 63b and a pedestal race 63c. The thrust race surrounds the quill part 85 and is carried thereby against the thrust face of the member 92. The pedestal race 63c surrounds the quill but is spaced therefrom and is carried by a spring block 95 which forms a part of the pedestal assembly including an annular series of coil springs 94, a pedestal member 93 and the pedestal block 84. The spring block 95 is provided with longitudinally projecting annular flanges 95' and 95" which cooperate with corresponding but oppositely disposed flanges 93' and 93" formed on the pedestal member 93. The cooperation of these flanges is two-fold in that they constitute—with the members on which they are formed—a housing for the springs 94 and they also constitute rigid thrust imparting struts when the flanges of the spring block 95 contact the flanges of the pedestal member 93.

From the foregoing it will be apparent that the spindle or shaft thrust in the direction of the arrow in Fig. 3 is taken up by the thrust bearings 64 and 65; that the counter-active force exerted by the bearing 64 never exceeds the strength of the springs 69 and 70 and that by properly designing these springs the ultimate or maximum shaft thrust can be so apportioned between the bearings 64 and 65 that neither bearing will be overloaded.

It should be noted that while the coil springs 74 are capable of carrying a substantial portion of the shaft thrust before they, together with the springs 69 and 70, yield to such an extent that the flanges 73', 73" cooperate with the respective flanges 75', 75" in providing substantially rigid thrust imparting and motion limiting struts, their strength is so proportioned to the combined strength of the springs 69 and 70 that a shaft thrust which compresses the springs 74 to the extent above mentioned will compress the springs 69 and 70 to the extent that their reactive or counter-acting force is equal to about one-half the total maximum thrust capable of being imparted by the shaft. It will, however, be apparent that this particular relationship need not necessarily be carried forward in connection with all embodiments of my invention since under some conditions it may be advantageous or even desirable to employ bearings of different size or an arrangement of bearings in which it is desirable to impose a greater duty on one bearing than on the other. In addition, more than two bearings may be employed for taking care of the thrust imposed by the shaft and under such circumstances the cooperating springs of each bearing assembly will be so proportioned as to apportion the maximum thrust among the bearings in accordance with the permissible maximum load for each bearing.

It should be noted that all that has been said concerning bearings 64 and 65 applies also to bearings 62 and 63 in connection with shaft thrusts in the direction of the arrow of Fig. 4. Under such conditions of thrust the bearings 64 and 65 do not function in transmitting shaft thrust to the fixed housing 58. It should, however, be noted that the springs 69, 70 and 74 must all be so designed that they are always under some tension and even under conditions of maximum thrust load in the direction of the arrow of Fig. 4. The converse of this applies also to the springs 82, 83 and 84 in that they must be so designed as to be under tension even under conditions where the shaft 57 occupies the position, with relation to the fixed housing 58, that it occupies when the thrust load is in the direction of the arrow of Fig. 3 and the flanges of the members 73 and 75 cooperate to form rigid thrust imparting struts. That is to say, all of the coil springs here involved must be under some tension at all times and independently of the position of the shaft 57 with relation to the housing 58. This is necessary in order to maintain the proper relationship between the ball bearing and pedestal parts here illustrated.

The above-mentioned condition to some extent designates another feature of my invention, i. e., what may be termed the assembly relationship of the parts. When Figs. 3 and 4 are considered together as illustrating a single structure such as a marine propeller shaft and its thrust housing, it will be apparent that the structure is bilaterally symmetrical about a plane extending at right angles to the axis of the shaft and located midway between the two thrust shoulders of the collar 66. With this in mind it will also be apparent that the structural features of each bearing and its associated pedestal assembly is such as to facilitate fabrication of the organized apparatus after the shaft is located approximately in place within the thrust housing. With the shaft in this position and the housing caps 59 and 60 removed, the bearing race 62a can be threaded over the shaft 57 and moved to position against the adjacent thrust shoulder of the collar 66. The bearing 62 may then be completed by locating the balls 62b in place on the race and by threading the race 62c over the shaft and into engagement with the balls. The assembly of each such bearing will be facilitated by turning the shaft 57 and housing 58 to a vertical position such that the balls will rest normally on the thrust race. So positioning the shaft and the housing will also facilitate assembly of the coil springs forming a part of each pedestal assembly. For example, turning the shaft 57 and its housing 58 to a vertical position such that the right end thereof—as illustrated in Fig. 4—is uppermost will facilitate the assembly of the separate parts of the bearing 62 and the parts associated therewith. After the bearing is in place against the collar 66, the spring or thrust block 80 is moved to place along the shaft 57 and into engagement with the pedestal race 62c. The coil springs 82 and 83 are then assembled on the member 80 and the pedestal member 81 is moved along the shaft to its normal position with relation to the springs 82 and 83 and the thrust or spring block 80. The quill part 85 is then telescoped over the end of the shaft 57 and moved to place along the shaft so that its inner end is supported by the shaft shoulder 86. This positions the thrust member 92 with relation to the shaft 57 and the housing 58 as a preliminary to assembling the bearing 63. The thrust race 63a is moved to position against the thrust member and balls 63a and race 63b are then assembled. The spring block 95 is then moved along the shaft into engagement with the pedestal race 63c of the bearing 63. The coiled springs 94 are then assembled and the pedestal member 93 is dropped to place so that it is, in effect, supported by the springs 94. The pedestal block 84 is then driven home within the housing 58 so that it engages the pedestal member 81 of the bearing 62. The outer quill part 85' is then telescoped over the shaft and moved to place so that its inner end engages with the quill portion 85. The roller bearing 61 is then moved onto the end of the quill part 85' with the inner race thereof engaging the quill shoulder 97. The housing ring 98 is then driven home against the thrust block 84. The inner diameter of this ring is such as to provide a sliding fit with the outer race of the roller bearing 61. The collar 87 is then threaded over the end of the shaft and secured in place thereon by the screws 88. This completes the support for the inner race of the bearing 61 and locks that race in position between the shoulder 97 of the quill part 85' and a corresponding but oppositely positioned shoulder formed on the collar 87. The cap 59 is then secured in place on the housing.

The assembly of the bearings 64—65—61' and the associated parts is in all respects similar to the procedure just described and can be facilitated by inverting the shaft 57 and housing 58 so that the left ends thereof, as illustrated in Fig. 3, are uppermost. It should also be noted that the operation of assembling the parts places each of the coil springs 69, 70, 74, 82, 83 and 94 under initial tension such that the collar 66 is held midway between the ends of the housing 58 by their co-action. That is to say, in assembling the parts they are so positioned relatively to each other that the springs 69, 70 and 74 are placed under initial tension which is equal to the initial tension under which the respective springs 82, 83 and 94 are placed, with the result that the shaft 57 is in effect floatingly supported within the housing with the collar 66 located midway between the ends of the housing.

It will be apparent during the operation of the shaft it—and its supporting bearings—will move longitudinally of the housing 58 in response to the thrust imposed upon the shaft. In this connection it will be understood that the bearing 61' corresponds to the bearing 61; that its inner race is locked in place by the quill part 76' and the collar 78; and that its outer race slidably engages a ring 98' which corresponds to the ring 98 and which actually forms a positioning piece between the thrust member 71 and the cap 60. It will also be understood that the flanges 93', 93'' in cooperation with the flanges 95' and 95'' limit this longitudinal movement of the shaft 57 and its bearings in one direction, i. e., in the direction indicated by the arrow in Figure 4; whereas the flanges 73' and 73'' in cooperation with the flanges 75' and 75'' limit the longitudinal movement of the shaft 57 and its bearings in the opposite direction; i. e., in the direction of the arrow in Figure 3. It should be noted that under no load conditions the shaft 57 occupies the intermediate position with relation to its housing 58 that the flanges of the part 93 are then spaced from the flanges of the part 95 an amount equal to the space between the flanges of the parts 73 and 75. That is to say, the shaft 57 will occupy a position, with relation to the housing 58, somewhat to the left of the position shown in both Figures 3 and 4 and such that the space between the flanges of the parts 93 and 95 will be substantially equal to the space between the flanges of the parts 73 and 75. This last mentioned space will be somewhat reduced below that shown in Figure 3. It will also be apparent that an increasing thrust in the direction of the arrow of Figure 3 will, eventually, cause the flanges of the part 75 to abut against the flanges of the part 73, and that when this occurs the relative motion between shaft 57 and housing 58 will cease and the flanges of the part 93 will be spaced the maximum amount from the flanges of the part 95.

It will also be understood that the parts are so designed and located that the flanges of the parts 67 and 80 never contact with the flanges of the respective parts 68 and 81. It will also be noted that the thrust transmitted by the bearing 62 to the housing 58 can never exceed that which is transmitted by that bearing at the instant the flanges of the parts 93 and 95 cooperate to form substantially rigid thrust transmitting struts and that the counteractive force exerted by the bearing 62 can never exceed the strength of the springs 82 and 83, i. e., the tension force of those springs at the instant the flanges of the parts 93 and 95 cooperate to constitute such thrust imparting struts. This being the case, it is necessary to so design the springs associated with the bearings 62 that they will transmit approximately one-half of the maximum shaft thrust (in the direction of arrow of Figure 4) where it is desired to apportion that thrust equally between the bearings 62 and 63.

It will be apparent that any provision may be made for lubricating the interior of the housing 58 such, for example as disclosed in Figure 1 and that the housing 58 may be anchored to the framework of the vessel or other carrying structure in any suitable manner so as to effectively transmit the shaft thrust to that structure. An inspection of Figure 1 will also disclose to those skilled in the art that the structural details there employed contribute to ease of assembly and disassembly as well as to effectiveness of operation.

While I have illustrated but two embodiments of my invention I desire it to be understood that various changes, modifications, additions and omissions may be made in each apparatus illustrated without departing from the spirit and scope of the invention as defined by the appended claims.

What I claim is:

1. In combination with a rotatable shaft, a thrust housing therefor, two thrust bearings for said shaft spaced longitudinally thereof and movable longitudinally therewith in response to thrust imparted thereto, a yielding support between one such bearing and said housing arranged to bring said bearing to a rigid seat on said housing after a predetermined longitudinal movement of said shaft, and a resilient support for the other thrust bearing so arranged as to continue to yieldingly support the same after the companion thrust bearing has moved to a rigid seat on the thrust housing.

2. In combination with a rotatable shaft, a thrust housing therefor, two thrust bearings for said shaft spaced longitudinally thereof and movable longitudinally therewith in response to thrust imparted thereto, a yielding support between one such bearing and said housing arranged to bring said bearing to a rigid seat on said housing after a predetermined longitudinal movement of said shaft, a resilient support for the other thrust bearing so arranged as to continue to yieldingly support the same after the companion thrust bearing has moved to a rigid seat on the thrust housing, and an anti-friction bearing between said housing and said shaft for resisting radial force imparted to said shaft by the rotation thereof and comprising race-confined anti-friction bearing members with the confining races movable longitudinally with said shaft and relatively to said housing.

KARL A. NYGREN.